US012148136B1

(12) United States Patent
Indeck et al.

(10) Patent No.: US 12,148,136 B1
(45) Date of Patent: Nov. 19, 2024

(54) SYSTEMS AND METHODS FOR DETERMINING FEATURE RESOLUTION OF IMAGE DATA

(71) Applicants: Joseph Stephen Indeck, Huntsville, AL (US); Kavan Hazeli, Tucson, AZ (US); Jesus O. Mares, Mary Esther, FL (US)

(72) Inventors: Joseph Stephen Indeck, Huntsville, AL (US); Kavan Hazeli, Tucson, AZ (US); Jesus O. Mares, Mary Esther, FL (US)

(73) Assignees: Board of Trustees for the University of Alabama, for and on behalf of the University of Alabama in Huntsville, Huntsville, AL (US); Government of the United States as represented by the Secretary of the Air Force, Wright-Patterson AFB, OH (US)

( * ) Notice: Subject to any disclaimer, the term of this patent is extended or adjusted under 35 U.S.C. 154(b) by 460 days.

(21) Appl. No.: 17/671,527

(22) Filed: Feb. 14, 2022

Related U.S. Application Data

(60) Provisional application No. 63/148,896, filed on Feb. 12, 2021.

(51) Int. Cl.
*G06T 7/60* (2017.01)
*G06T 7/00* (2017.01)
*G06T 7/11* (2017.01)

(52) U.S. Cl.
CPC ............ *G06T 7/0002* (2013.01); *G06T 7/11* (2017.01); *G06T 7/60* (2013.01); *G06T 2207/20076* (2013.01); *G06T 2207/30168* (2013.01)

(58) Field of Classification Search
CPC . G06T 7/0002; G06T 7/11; G06T 7/60; G06T 2207/20076; G06T 2207/30168
See application file for complete search history.

(56) References Cited

U.S. PATENT DOCUMENTS

| 7,092,564 | B2 * | 8/2006 | Jia | ..................... G06T 11/001 382/307 |
| 11,841,920 | B1 * | 12/2023 | Marsden | ................. G06T 7/248 |

(Continued)

OTHER PUBLICATIONS

Behrooz, et al., Image Resolution in MicroCT: Principles and Characterization of the Quantum FX and Quantum GX Systems, PerkinElmer, Inc., pp. 1-5, 2016.

(Continued)

*Primary Examiner* — Congvan Tran
(74) *Attorney, Agent, or Firm* — Butler Snow LLP; Jon E. Holland

(57) ABSTRACT

An image processing system receives a digital image and analyzes the digital image to determine a resolution limit, referred to herein as "feature resolution," for measuring a metric for features of the image within an acceptable margin of error. Specifically, the system segments a digital image and calculates the error associated with the segmented data when features within a certain range a measured metric (e.g., size range) are removed from the segmented data. This analysis can be repeatedly performed with different cutoff values for the metric until at least a threshold amount of error is reached, thereby indicating a resolution limit at the boundary of an acceptable amount of error.

14 Claims, 4 Drawing Sheets

(56) References Cited

U.S. PATENT DOCUMENTS

| | | | | |
|---|---|---|---|---|
| 2011/0074966 A1* | 3/2011 | Cerosaletti | ............ | G06V 10/993 348/222.1 |
| 2011/0295575 A1* | 12/2011 | Levine | .................... | G06F 17/10 703/2 |
| 2020/0043134 A1* | 2/2020 | Martin | .................. | G06T 3/4038 |
| 2022/0299881 A1* | 9/2022 | Zheng | .................... | G03F 7/705 |
| 2022/0342316 A1* | 10/2022 | Kooiman | ............ | G03F 7/70625 |

OTHER PUBLICATIONS

Cohen, et al., "Resolution Limit of Image Analysis Algorithms," Nature Communications, pp. 1-12, vol. 10, 2019.

Forbes, et al., Statistical Distributions Fourth Edition, Wiley, pp. 1-231, 2011.

Friedman, et al., "A Simple Approach to Measure Computed Tomography (CT) Modulation Transfer Function (MTF) and Noise-Power Spectrum (NPS) Using the American College of Radiology (ACR) Accreditation Phantom," American Academy of Physical Medicine and Rehabilitation, pp. 1-9, vol. 40, No. 5, May 2013.

Greene, "Economic Analysis," Prentice Hall, pp. 1-828, 2003.

Nelder, et al., "A Simplex Method for Function Minimization," The Computer Journal 7, pp. 308-313, 1965.

Patterson, et al., "Dimensional Quantification of Embedded Voids or Objects in Three Dimensions Using X-Ray Tomography," Microscopy and Microanalysis Analytical Chemistry, pp. 8537-8543, vol. 82, No. 20, 2010.

Rueckel, et al., "Spatial Resolution Characterization of a X-ray microCT System," Applied Radiation and Isotopes, pp. 230-234, vol. 94, 2014.

Scott, "On Optimal and Data-based Histograms," Biometrika, pp. 605-610, vol. 66, No. 3, 1979.

Silverman, "Density Estimation for Statistics and Data Analysis," Chapman and Hall, pp. 1-22, 1986.

Sintay, et al., "Testing the Accuracy of Microstructure Reconstruction in Three Dimensions Using Phantoms," Modeling and Simulation in Materials Science and Engineering, pp. 1-18, vol. 20, 2012.

Verdun, et al., "Image Quality in CT: From Physical Measurements to Model Observers," Physica Medica, pp. 823-843, vol. 31, 2015.

Virtanen, et al., "SciPy 1.0: Fundamental Algorithms for Scientific Computing in Python," Nature Methods, pp. 261-272, vol. 17, No. 3, 2020.

* cited by examiner

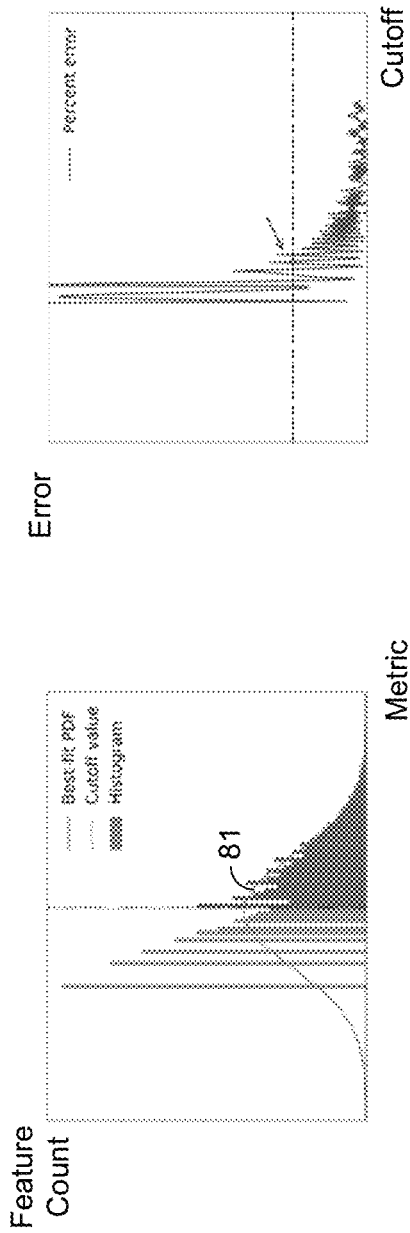
FIG. 5
FIG. 7
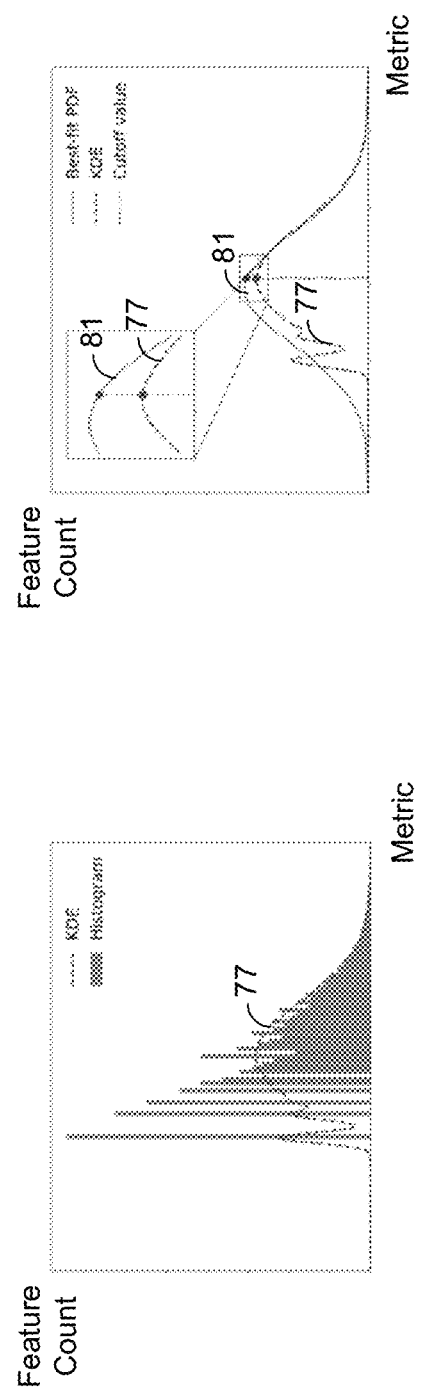
FIG. 4
FIG. 6

SYSTEMS AND METHODS FOR DETERMINING FEATURE RESOLUTION OF IMAGE DATA

CROSS REFERENCE TO RELATED APPLICATION

This application claims priority to U.S. Provisional Patent Application No. 63/148,896, entitled "Determination of the Feature Resolution of Processed Image Data via Statistical Analysis," and filed on Feb. 12, 2021, which is incorporated herein by reference.

FEDERALLY SPONSORED RESEARCH OR DEVELOPMENT STATEMENT REGARDING

This invention was made with Government support by the United States Air Force Research Laboratory. The Government has certain rights in the invention.

RELATED ART

Standardization of data analysis methods of various image processing techniques is lacking despite the abundant use of microscopy tools to characterize the microstructure of various materials. Two parameters that are often reported for digital imaging include the scan resolution (e.g., pixel or voxel size) and the spatial resolution (e.g., the size of the smallest detectable object). However, neither scan resolution nor spatial resolution give the user an estimation of the minimum feature size for a condition under analysis. Further, the user typically does not receive any indication of the features that cannot be resolved.

In this regard, if the resolution of a processed image is relatively small (e.g., defined by relatively few pixels in the case of a two-dimensional image or voxels in the case of a three-dimensional image), then the error in using the image to calculate a physical metric (e.g., length or area) of a feature within the image is generally greater than a processed image of greater resolution. For example, in measuring the length of feature in an image, such as a tumor or a bone fracture in an MRI or x-ray image, the accuracy of the measured length can be greatly affected by the image's resolution. In general, increasing the resolution generally increases the number of pixels or voxels within the feature, and having an insufficient number of pixels or voxels can increase the measurement error in some cases depending on the size of the features and other factors, such as the segmentation techniques employed. The measurement error resulting from insufficient image resolution is dependent on various factors including the feature size (which can vary from image-to-image), contrast of the captured image, camera positioning, and other factors. Such measurement error can be difficult to quantify in practice, thereby making it difficult to ascertain whether a processed image is of sufficient resolution relative to a captured image to provide a reliable measurement.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 4 is a graph illustrating an exemplary histogram representing a dataset of segmented data and a probability density function (PDF) for the full dataset.

FIG. 5 is a graph illustrating the histogram of FIG. 4 and a PDF of a portion of the data set.

FIG. 6 is a graph illustrating the PDF of FIG. 4 and the PDF of FIG. 5.

FIG. 7 is a graph illustrating estimated percent error versus cutoff value for a range of cutoff values.

DETAILED DESCRIPTION

Figure 1:
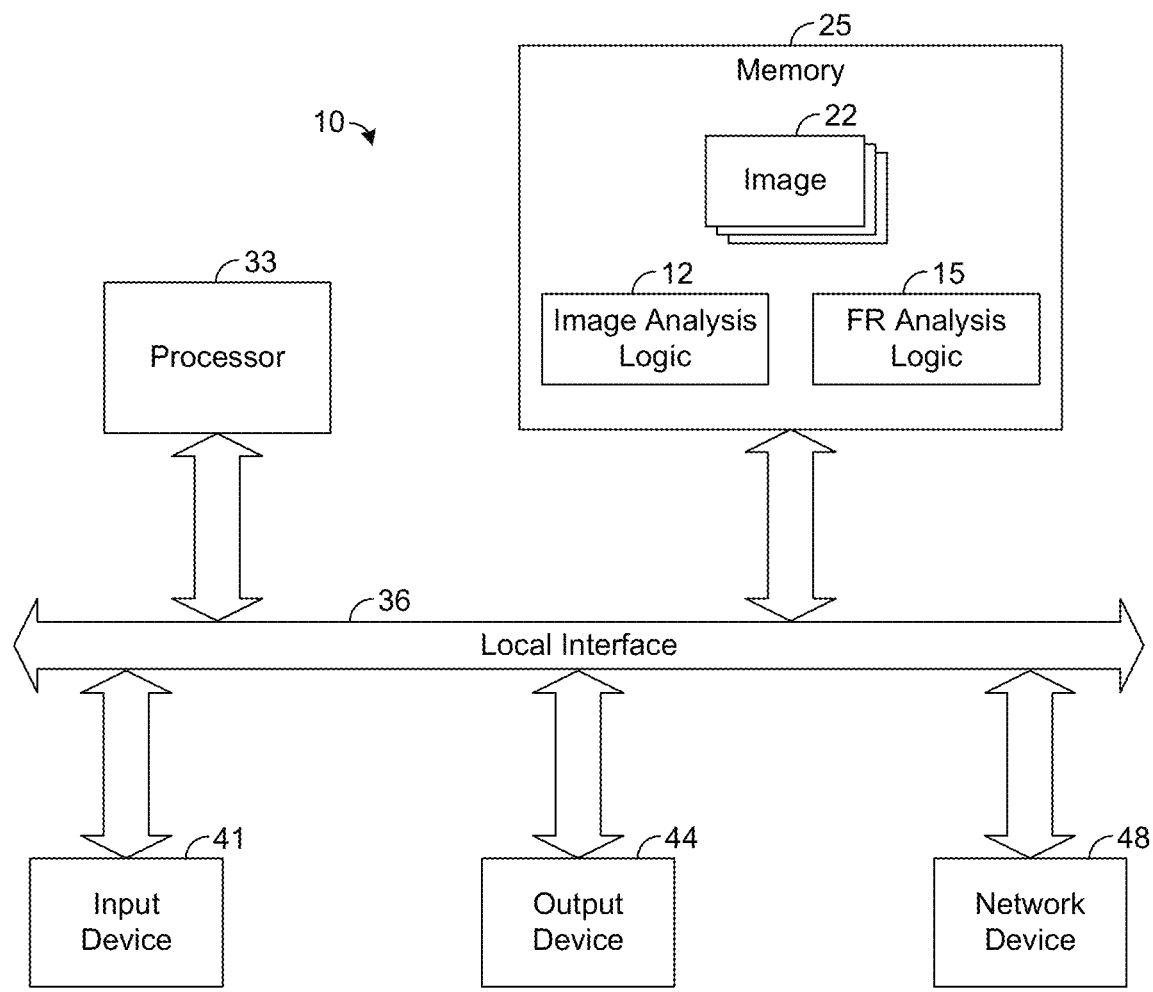
FIG. 1 is a block diagram illustrating an exemplary embodiment of an image processing system for determining a feature resolution of captured images.

The present disclosure generally pertains to systems and methods for determining feature resolution of images. As used herein, the term "feature resolution" generally refers to the effective minimum detection limit of a physical metric or, in other words, the minimum resolution that provides an acceptable margin of error for a physical metric to be measured. For example, in measuring a physical metric of a feature in an image, such as a length or area of crack in an imaged object, the feature resolution generally refers to the minimum resolution that is required in order to measure the metric (i.e., crack length or area in this example) within an acceptable margin of error.

In some embodiments, the feature resolution is calculated using a statistical analysis of image data from one or more images that have been processed (e.g., segmented). Specifically, during processing and segmentation of an image, objects are identified and classified. For example, edge detection may be used to detect boundaries of objects, and the pixels associated with a given object can be identified and grouped together to define the object. Feature resolution (FR) analysis logic may be configured to receive segmented image data as input and to then perform a statistical analysis on the segmented image data in order to determine a feature resolution for the processed images.

In this regard, the FR analysis logic may be configured to characterize the segmented image data as a function of the metric under analysis, such as by defining a probability density function (PDF) of the segmented image data for the metric. The FR analysis logic may be configured to remove a portion of the segmented data to define a truncated dataset such that features having a value for the metric below a threshold, referred to herein as "cutoff value," are not included in the truncated dataset. The FR analysis logic may then characterize the truncated dataset as a function of the metric under analysis, such as by defining a PDF for the truncated dataset and compare the characterizations to estimate an amount of pixilation error associated with the cutoff value. This process may be performed for different cutoff values to find a cutoff value at which point the error (e.g., pixilation error being one source) begins to increase significantly (which occurs when the PDFs begin to diverge significantly), noting that this point corresponds to the feature resolution for the image.

Note that there are various techniques that may be used to perform the analysis described above. In some embodiments, the FR analysis logic is configured to analyze segmented image data defining a digital image to determine a histogram indicative of the distribution of the feature metric being measured, and a curve fit is applied to the histogram to generate a distribution curve for the feature metric. In general, using large, well-defined features in the dataset will result in an accurate match to the assumed distribution curve. Deviation from the assumed distribution curve will occur when smaller, poorly-defined features approaching and below the feature resolution are also included. Therefore, the percent error between the assumed distribution curve and the dataset can be calculated as a function of how much data is included. The feature resolution can then be determined once an allowable amount of deviation from the assumed distribution curve is reached.

FIG. 1 depicts an image processing system 10 in accordance with some embodiments of the present disclosure. As shown by FIG. 1 the image processing system comprises image analysis logic 12 and feature resolution (FR) analysis logic 15 that are configured to process one or more digital images 22 and determine a feature resolution for one or more of the images 22. Note that the image analysis logic 12 and the FR analysis logic 15 can be implemented in software, hardware, firmware or any combination thereof. In the exemplary system 10 illustrated by FIG. 1, the image analysis logic 12 and the FR analysis logic 15 are implemented in software and stored in memory 25 of the system 10.

Note that the image analysis logic 12 and the FR analysis logic 15, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary system 10 depicted by FIG. 1 comprises at least one conventional processor 33, such as a digital signal processor (DSP) or a central processing unit (CPU), that communicates to and drives the other elements within the system 10 via a local interface 36, which can include at least one bus. Furthermore, an input device 411, for example, a keyboard or a mouse, can be used to input data from a user of the system 10, and an output device 44, for example, a printer, monitor, liquid crystal display (LCD), or other display apparatus, can be used to output data to the user. Further, a network device 48, such as at least one modem, may be used to exchange data with a communication network (not shown).

In some embodiments, the image processing system 10 may be implemented by a computing device, such as a desktop, laptop, or handheld computer or a server. The image processing system 10 may be coupled to or receive images 22 from an image capturing apparatus (not shown), such as a camera, MRI machine, electronic microscope, or other conventional device capable of capturing images. Each image 22 has image data (e.g., a plurality of pixels in the case of two-dimensional images or voxels in the case of three-dimensional images) defining an image to be analyzed by the image analysis logic 12.

In this regard, the image analysis logic 12 is configured to process each image 22 and to perform image segmentation on each image in order to identify objects of interest within the image 22. As an example, the image analysis logic 12 may perform edge detection, as known in the art, in order to detect boundaries of objects within an image 22 being processed, and the pixels or voxels associated with a given object can be identified and grouped together to define the object. Image segmentation is generally a well-known process and will not be described in further detail.

Feature resolution (FR) analysis logic 15 is configured to receive segmented image data defining an image 22 and to then perform a statistical analysis on the segmented image data in order to determine a feature resolution for a certain feature metric of interest within the image. After determining the feature resolution, the FR logic 15 may be configured to provide information indicative of the determined feature resolution, such as by displaying such information with the output device 44 or transmitting, via the network device 48 and a network (not shown), the information to another device for presentation to user. In some embodiments, such information may specify the feature resolution that is needed in order for a measurement of the feature metric of interest within the image 22 to be within a desired margin of error. Thus, a user may compare the determined feature resolution to the resolution of the hardware that captured the image 22 or is to be used to capture similar images in order to ascertain whether the resolution of the hardware is sufficient for the measurement of the feature metric. Alternatively, the feature resolution determined by the FR logic 15 may be used by the FR analysis logic 15 to estimate a likely amount of error associated with a measurement of the feature within the image 22, and the information provided by the FR analysis logic 15 to the user may specify the error estimation, which can then be used by the user to ascertain whether the resolution of the hardware used to capture the image 22 is sufficient or for other purposes.

Note that a feature may be a group of pixels within the image 22 that have certain properties of interest. As an example, an object may be imaged in order to provide a digital image of the object's surface that can be analyzed to determine various parameters. For example, the object's surface may have certain features, such as cracks, pores, or other voids, for which it is desirable to measure a certain metric for analysis. A metric may be any physical property of a feature, such as the feature's length, width, or thickness. In some cases, one metric may be calculated from the measurements of a plurality of metrics. As an example, an area or volume of a feature may be calculated using the feature's measured dimensions, such as length, width, and thickness. As noted above, the measurement of any metric may be associated with a certain amount of error that is generally greater for images of lower resolution. Accurately quantifying such error or the feature resolution that provides an acceptable amount of error is generally desirable. As an example, this information may be used to determine whether the image 22 or the apparatus that captured the image 22 is acceptable for certain uses, noting that other uses of the information are possible in other examples.

An exemplary method of determining feature resolution will be described in more detail below with reference to FIG. 2.

Figure 2:
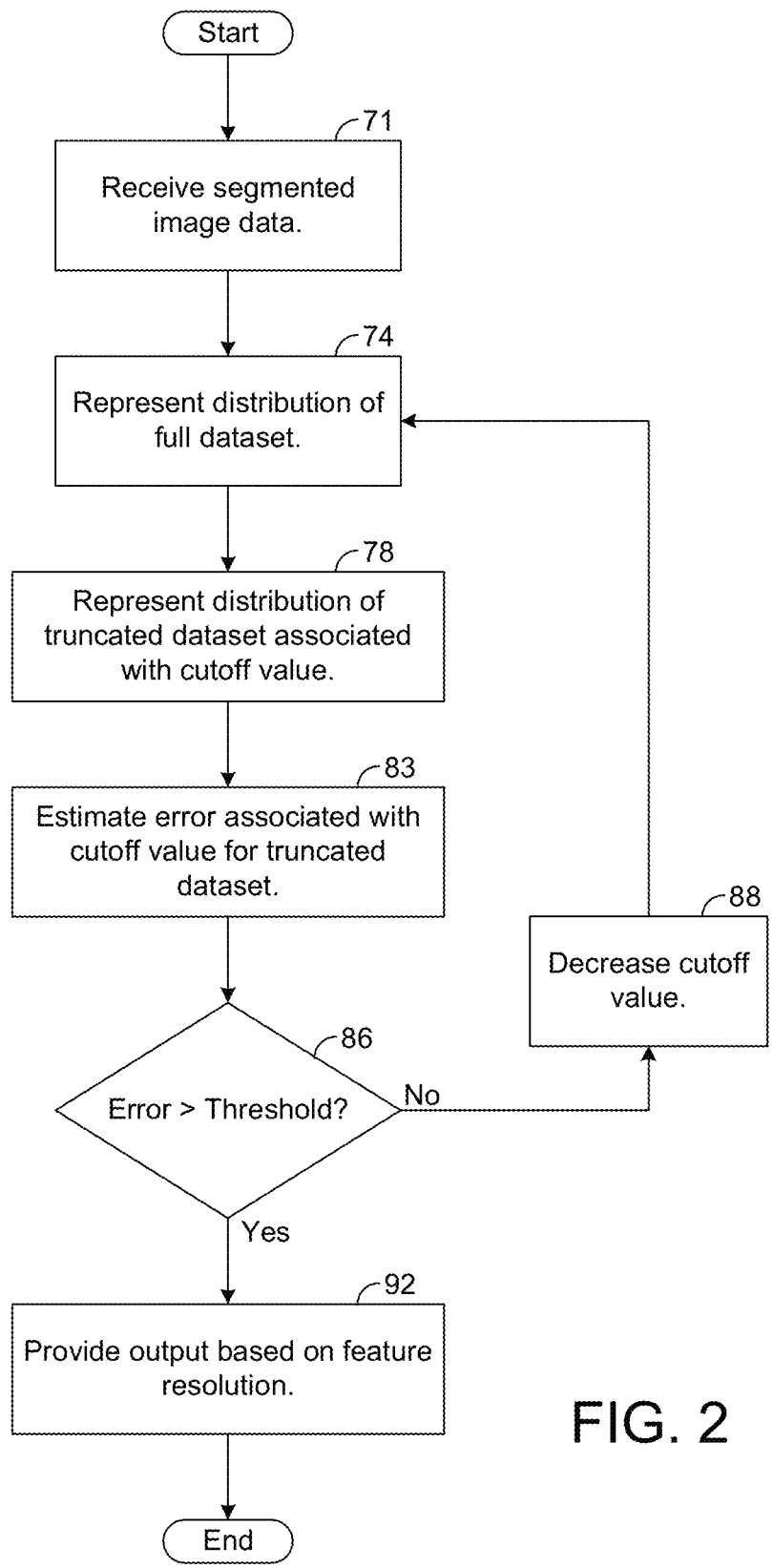
FIG. 2 is a flow chart illustrating an exemplary method of determining feature resolution.
Figure 3:
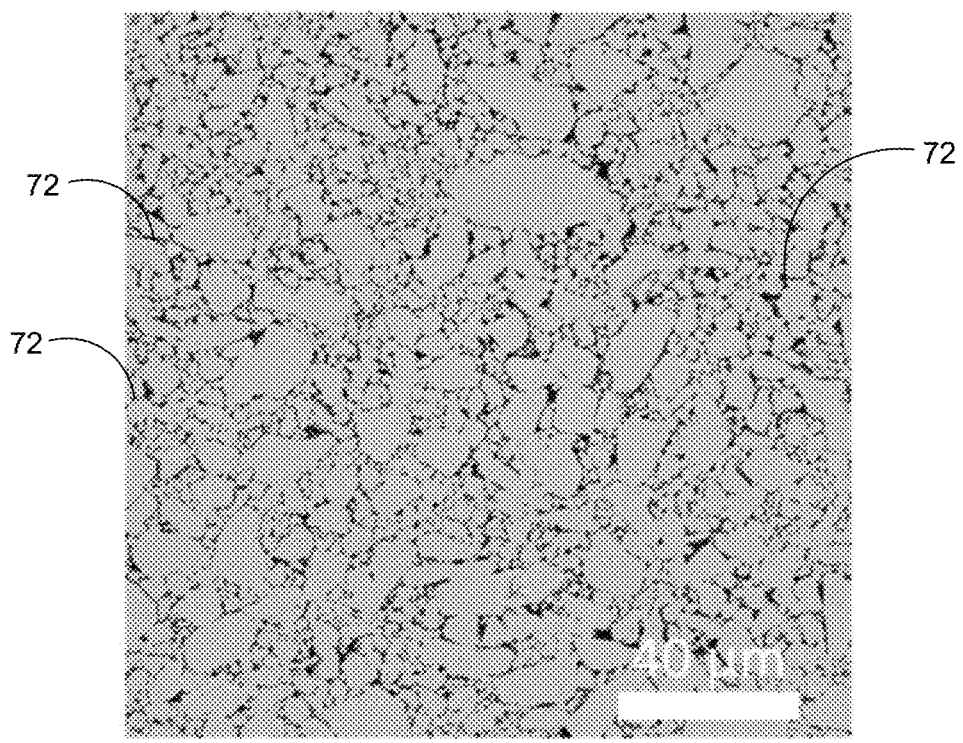
FIG. 3 is a diagram illustrating an exemplary image that may be processed and analyzed by an image processing system, such as is depicted by FIG. 1.

The image analysis logic 15 is configured to analyze and segment at least one image 22 to provide segmented data that is provided to the FR analysis logic 15, as shown by block 71 of FIG. 2. As an example, for illustrative purposes, assume that the image 22 has features, such as cracks 72 or other types of voids, within an imaged surface as shown by FIG. 3, and it is desirable to measure the area (or other metric) of one or more cracks 72. In such example, the segmentation performed on the image may identify each crack 72 and, for each such feature, provide a value indicating the measured area (or other metric). Thus, the segmented data may be analyzed to determine the number of identified cracks 72 and the respective area (or other metric)

of each such crack 72. While it is possible to analyze a single image 22 using the techniques described herein, analyzing a greater number of images can increase the statistical accuracy of the results by providing datasets that more accurately reflect the PDFs being assumed. Thus, the segmented data received in block 71 may be from many digital images 22 captured by the same or similar hardware under test.

The FR analysis logic 15 is configured to determine and analyze a histogram of the dataset defined by the segmented data. In general, the histogram generally represents the distribution of features relative to the metric being considered. FIG. 4 depicts an exemplary histogram representing the dataset received from the image analysis logic 12. Each vertical column in FIG. 4 may represent the number of features (e.g., cracks in the current example) that have a metric (e.g., area in the current example) within a certain range.

As shown by block 74 of FIG. 2, the FR analysis logic 15 is configured to analyze the dataset and represent the distribution of the full dataset. In some embodiments, this is achieved by performing kernel density estimation (KDE), which is a known data smoothing algorithm that can be used to estimate the probability density function (PDF) of a random variable, which in this case is the feature metric being considered. FIG. 4 shows a curve 77 representing the KDE probability density function determined by the FR analysis logic 15 for the full dataset being analyzed. In other embodiments, other types of techniques for calculating a PDF are possible.

As shown by block 78 of FIG. 2, the FR analysis logic 15 is also configured to analyze the dataset and represent the distribution of a truncated dataset associated with a given cutoff value for the metric being considered. In this regard, for a first iteration, a relatively large cutoff value may be selected so that the error associated with the cutoff value is likely to be within a desired tolerance, as will become more apparent in the below description, and each feature correlated with a metric value below the selected cutoff value is removed from the dataset. In the current example for which area is the metric, features (e.g., cracks 72) having an area below the selected cutoff value are removed from the dataset, thereby providing a truncated dataset, and the FR analysis logic 15 calculates a probability density function (PDF) of the truncated data set using a curve fitting algorithm (e.g., a "best-fit" algorithm). FIG. 5 depicts a curve 81 representing a best-fit PDF for the truncated data set associated with a cutoff value, x.

As shown by FIG. 6 and block 83 of FIG. 2, the FR analysis logic 15 is configured to compare the KDE PDF of the full dataset determined in block 74 to the best-fit PDF of the truncated dataset determined in block 78 in order to estimate an amount of error, associated with the cutoff value used for the best-fit PDF. Specifically, this estimated error is represented by the difference between the KDE PDF and the best-fit PDF at the point correlated with the cutoff value, as shown by FIG. 6.

Note that FIG. 7 depicts error percentage as a function of cutoff value. Such a graph may be determined by performing blocks 71, 74, 78, and 83 for a range of cutoff values. Through experimentation, it has been observed that when data near the scan resolution is included in the truncated data set as the cutoff value is decreased, there is a significant increase in error between the best-fit PDF and the KDE PDF. This result illustrates that data near the scan resolution contains a greater degree of uncertainty relative to data much greater than the scan resolution. This error is due primarily to integer rounding of the values that represent pixilation error. As the error increases with the decreasing cutoff value, it is evident that the represented data (i.e., the truncated dataset) no longer follows the log-distribution and can be assumed to be below the effective feature resolution limit. The feature resolution limit is therefore defined where the percent error difference between the best-fit PDF and the KDE PDF reaches a specified error, e.g., 10%. This error limit is a user-defined value dependent upon the tolerable amount of error for the specific metric of interest.

Referring to block 86 of FIG. 2, after calculating the error associated with the current cutoff value, the FR analysis logic 15 is configured to compare the estimated error to a predefined threshold, which represents the maximum acceptable error as defined by a user. If the threshold is not exceeded, then the FR analysis logic 15 is configured to decrease the cutoff value, as shown by block 88 of FIG. 2, and repeat the aforementioned process. If comparison of the estimated error exceeds the predefined threshold in block 86, then the FR analysis logic 15 determines the feature resolution or, in other words, the minimum resolution limit that keeps error within the desired tolerance.

For example, the FR analysis logic 15 may determine the cutoff value at the approximate point at the boundary of an acceptable margin of error. As an example, the FR analysis logic 15 may identify the smallest cutoff value that still results in an acceptable amount of error determined in block 86. The identified cutoff value at the boundary of an acceptable margin of error indicates the feature resolution for the images being processed. That is, the cutoff value indicates the smallest feature size that can be accurately measured within the desired margin of error. As shown by block 92 of FIG. 2, the FR analysis logic 15 may output information indicative of or otherwise based on the determined feature resolution (e.g., the identified cutoff value). As an example, the FR analysis logic 15 may display via the output device 44 (e.g., a display device) or otherwise information that specifies the determined resolution limit.

In other embodiments, other information based on the determined feature resolution. As an example, the FR analysis logic 15 may be aware of the resolution of the hardware (e.g., camera) used to capture the analyzed image and compare such resolution to the resolution to ascertain whether the hardware's resolution is sufficient to measure the metric under analysis within an acceptable tolerance. Such information may be output to the user. Alternatively, using the hardware's resolution and the determined feature resolution, the FR analysis logic 15 may calculate the amount (e.g., percentage) of error likely for the hardware and provide such information to a user. Yet other types of information based on the determined feature resolution are possible in other examples.

Thus, using the techniques described above, the FR logic 15 of the image processing system 10 receives a digital image and analyzes the digital image to determine its feature resolution. In the examples described above, the FR logic 15 calculates the error associated with segmented data when features associated with a certain metric range (e.g., size) are removed from the segmented data. As described above, this analysis can be repeatedly performed with decreasing cutoff values for the metric until at least a threshold amount of error is reached, thereby indicating a resolution limit at the boundary of an acceptable amount of error.

It should be emphasized that the specific techniques described above for determining the feature resolution are exemplary, and various changes and modifications may be made to the techniques as would be appreciated by a person of ordinary skill upon reading this disclosure. As an example, to find the resolution limit for an acceptable margin of error, it is possible to begin with a relatively small cutoff value such that the estimated error exceeds the predefined error threshold and to increase the cutoff value until the estimated error falls below the predefined error threshold. Various other changes and modifications would be apparent to a person of ordinary skill upon reading this disclosure.

Now, therefore, the following is claimed:

1. An image processing system for determining feature resolutions of digital images, comprising:
   memory for storing at least one digital image;
   at least one processor programmed with instructions that when executed by the at least one processor cause the at least one processor to:
   segment the at least one digital image, thereby providing a first dataset defining a plurality of identified features in the at least one digital image, each of the identified features correlated with a value for a metric;
   calculate a first probability distribution function (PDF) representing a distribution of the identified features within the first dataset as a function of the metric;
   remove, from the first dataset, a portion of data defining features correlated with values for the metric below the first cutoff value, thereby defining a second dataset;
   calculate a second PDF representing a distribution of the features for the second dataset as a function of the metric;
   compare the first PDF and the second PDF;
   determine an error associated with the first cutoff value based on comparing the first PDF and the second PDF; and
   determine a feature resolution for the at least one digital image based on the error.

2. The system of claim 1, wherein the instructions when executed by the at least one processor cause the at least one processor to:
   compare the error to a predefined threshold; and
   determine the feature resolution based on comparison of the error to the predefined threshold.

3. The system of claim 1, wherein the instructions when executed by the at least one processor cause the at least one processor to:
   remove, from the first dataset, at least portion of data defining features correlated with values for the metric below a second cutoff value, thereby defining a third dataset;
   calculate a third PDF representing a distribution of the features for the third dataset as a function of the metric;
   compare the first PDF and the third PDF;
   determine an error associated with the second cutoff value based on comparing the first PDF and the third PDF; and
   determine the feature resolution for the at least one digital image based on the error associated with the second cutoff value.

4. The system of claim 1, wherein the instructions when executed by the at least one processor cause the at least one processor to provide an output based on the feature resolution.

5. An image processing system for determining feature resolutions of digital images, comprising:
   memory for storing a first dataset defining segmented data of at least one digital image; and
   at least one processor configured to characterize the first dataset as a function of a measured metric for identified features in the at least one digital image, thereby providing a first characterization, the at least one processor configured to remove a portion of the first dataset based on a first cutoff value to define a second dataset, the at least one processor configured to characterize the second dataset as a function of the measured metric, thereby providing a second characterization, the at least one processor further configured to compare the first characterization and the second characterization and to determine an error associated with the first cutoff value based on comparison of the first characterization and the second characterization, wherein the at least one processor is configured to determine a feature resolution for the at least one digital resolution based on the error.

6. The system of claim 5, wherein the at least one processor is configured to characterize the first dataset by calculating a first probability distribution function (PDF), and wherein the at least one processor is configured to characterize the second dataset by calculating a second probability distribution function.

7. The system of claim 5, wherein the at least one processor is configured to compare the error to a predefined threshold and to determine the feature resolution based on comparison of the error to the predefined threshold.

8. The system of claim 5, wherein the at least one processor is configured to remove a portion of the first dataset based on a second cutoff value to define a third dataset such that identified features having a value for the measured metric below the second cutoff value are removed, wherein the at least one processor is configured to characterize the third dataset as a function of the measured metric, thereby providing a third characterization, wherein the at least one processor is further configured to compare the first characterization and the second characterization and to determine an error associated with the second cutoff value based on comparison of the first characterization and the third characterization, and wherein the at least one processor is configured to determine the feature resolution for the at least one digital resolution based on the error associated with the second cutoff value.

9. The system of claim 5, wherein the at least one processor is configured to provide an output based on the feature resolution.

10. A method for determining feature resolutions of digital images, comprising:
    storing, in memory, a first dataset defining segmented data of at least one digital image;
    characterizing, with at least one processor, the first dataset as a function of a measured metric for identified features in the at least one digital image, thereby providing a first characterization;
    removing, with the at least one processor, a portion of the first dataset based on a first cutoff value, thereby defining a second dataset, such that identified features having a value for the measured metric below the first cutoff value are removed;
    characterizing, with the at least one processor, the second dataset as a function of the measured metric, thereby providing a second characterization;
    comparing, with the at least one processor, the first characterization and the second characterization;
    determining, with the at least one processor, an error associated with the first cutoff value based on the comparing; and determining, with the at least one processor, a feature resolution for the at least one digital image based on the error.

11. The method of claim 10, wherein the characterizing the first dataset comprises calculating a first probability distribution function (PDF), and wherein the characterizing the second dataset comprises calculating a second probability distribution function.

12. The method of claim 10, further comprising comparing the error to a predefined threshold, wherein the determining the feature resolution is based on the comparing the error to the predefined threshold.

13. The method of claim 10, further comprising:
removing, with the at least one processor, a portion of the first dataset based on a second cutoff value, thereby defining a third dataset, such that identified features having a value for the measured metric below the second cutoff value are removed;
characterizing, with the at least one processor, the third dataset as a function of the measured metric, thereby providing a third characterization;
comparing, with the at least one processor, the first characterization and the third characterization; and
determining, with the at least one processor, an error associated with the second cutoff value based on the comparing the first characterization and the third characterization,
wherein the determining the feature resolution is based on the error associated with the second cutoff value.

14. The method of claim 10, further comprising providing an output based on the feature resolution.

\* \* \* \* \*